United States Patent
Codilian et al.

(10) Patent No.: US 6,707,637 B1
(45) Date of Patent: Mar. 16, 2004

(54) DISK DRIVE INCLUDING DISK SPACER WITH DIFFERENT SIDE SURFACE PATTERNS

(75) Inventors: Raffi Codilian, Irvine, CA (US); Serge Hauert, San Jose, CA (US); Steven J. Alfred, Longmont, CO (US)

(73) Assignee: Western Digital Technologies, Inc., Lake Forest, CA (US)

( * ) Notice: Subject to any disclaimer, the term of this patent is extended or adjusted under 35 U.S.C. 154(b) by 68 days.

(21) Appl. No.: 10/022,152

(22) Filed: Dec. 14, 2001

(51) Int. Cl.$^7$ .............................................. G11B 17/08
(52) U.S. Cl. ................. 360/98.08; 360/99.12
(58) Field of Search ........................ 360/98.08, 99.05, 360/99.12

(56) References Cited

U.S. PATENT DOCUMENTS

| | | | |
|---|---|---|---|
| 4,777,549 A | * 10/1988 | Dushkes et al. | 360/97.03 |
| 4,922,354 A | * 5/1990 | Edwards | 360/97.03 |
| 5,267,106 A | * 11/1993 | Brue et al. | 360/98.08 |
| 5,504,638 A | * 4/1996 | Kinoshita et al. | 360/98.08 |
| 5,548,457 A | * 8/1996 | Brooks et al. | 360/98.08 |
| 5,600,512 A | * 2/1997 | Radwam et al. | 360/98.08 |
| 5,712,746 A | * 1/1998 | Moir et al. | 360/98.08 |
| 6,130,801 A | * 10/2000 | Cheng et al. | 360/98.08 |
| 6,172,844 B1 | * 1/2001 | Luo et al. | 360/98.08 |
| 6,201,661 B1 | * 3/2001 | Korkowski | 360/98.08 |
| 6,222,700 B1 | * 4/2001 | Martin et al. | 360/98.08 |
| 6,255,750 B1 | * 7/2001 | Mohajerani et al. | 310/51 |
| 6,288,867 B1 | * 9/2001 | Jierapipatanakul et al. | 360/98.08 |
| 6,381,092 B1 | * 4/2002 | Suzuki | 360/98.08 |
| 2001/0036038 A1 | 11/2001 | Kazmierczak | |

FOREIGN PATENT DOCUMENTS

JP  5-210936  * 8/1993

* cited by examiner

Primary Examiner—Brian E. Miller
(74) Attorney, Agent, or Firm—Won Tae C. Kim, Esq.; Milad G. Shara, Esq.; Stetina Brunda Garred & Brucker

(57) ABSTRACT

An aspect of the invention can be regarded as a disk drive that includes a disk drive base and a spindle motor hub rotatably coupled to the disk drive base. The disk drive further includes a first disk disposed about the spindle motor hub. The disk drive further includes a second disk disposed about the spindle motor hub. The disk drive further includes a first disk spacer disposed between and in mechanical communication with the first and second disks. The first disk spacer has a first disk spacer first side disposed adjacent the first disk and an opposing first disk spacer second side disposed adjacent the second disk. The first disk spacer first side is defined by a first disk spacer first surface pattern. The first disk spacer second side is defined by a first disk spacer second surface pattern different than the first disk spacer first surface pattern.

21 Claims, 2 Drawing Sheets

DISK DRIVE INCLUDING DISK SPACER WITH DIFFERENT SIDE SURFACE PATTERNS

BACKGROUND OF THE INVENTION

1. Cross-Reference to Related Applications

Not applicable.

2. Field of the Invention

The present invention relates generally to disk drives, and in particular to a disk drive including disks having different disk stiffness, thickness and material combinations.

3. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The head stack assembly has an actuator assembly having at least one head or slider, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly and a flex circuit cable assembly that are attached to the actuator assembly. A conventional "rotary" or "swing-type" actuator assembly typically comprises an actuator body, a pivot bearing cartridge, a coil portion that extends from one side of the actuator body to interact with one or more permanent magnets to form a voice coil motor, and one or more actuator arms which that extend from an opposite side of the actuator body. The actuator body includes a bore and the pivot bearing cartridge engaged within the bore for allowing the actuator body to rotate between limited positions. At least one head gimbal assembly (HGA) is distally attached to each of the actuator arms. A head gimbal assembly includes a head for reading and writing data to and from the disks. In this regard, the actuator assembly is controllably rotated so as to move the heads relative to the disks for reading and writing operations with respect to the tracks contained on the disks.

It is contemplated that during operation of the disk drive, the inner disks may be subjected to different air flow conditions than the outermost disks, such as those adjacent the disk clamp and spindle motor hub flange. This is because the inner disks are disposed adjacent the other disks which are similarly rotating. Whereas the outermost disks are each disposed adjacent a similarly rotating structure (e.g., an innermost disk) and a respective stationary structure (e.g., the interior of the cover and the disk drive base among other disk drive components). Such differing air flow environments are contemplated to impact the motion of the disks differently. Comparatively, the inner disks are observed to have a higher degree of disk motion due to such air flow environment (i.e., disk flutter). Such disk flutter affects the position errors associated with positioning of the heads relative to the disks. In addition, it is contemplated that because the disks are repeating similarly configured structures in close proximity to each other, the disks may tend to become sources of resonance excitation to an adjacent disk resulting in relatively increased combined vibration amplitudes. Such relatively increased resonance amplitudes also increase position errors associated with positioning of the heads relative to the disks. Accordingly, there is a need in the art for an improved disk drive in comparison to the prior art.

SUMMARY OF THE INVENTION

An aspect of the invention can be regarded as a disk drive that includes a disk drive base and a spindle motor hub rotatably coupled to the disk drive base. The disk drive further includes a first disk disposed about the spindle motor hub. The disk drive further includes a second disk disposed about the spindle motor hub. The disk drive further includes a first disk spacer disposed between and in mechanical communication with the first and second disks. The first disk spacer has a first disk spacer first side disposed adjacent the first disk and an opposing first disk spacer second side disposed adjacent the second disk. The first disk spacer first side is defined by a first disk spacer first surface pattern. The first disk spacer second side is defined by a first disk spacer second surface pattern different than the first disk spacer first surface pattern.

According to various embodiments, the first disk spacer first surface pattern may include a uniform diameter. Alternatively, the first disk spacer first surface pattern may include a non-uniform diameter. For example, the first disk spacer first surface pattern may include a sinusoidal shaped periphery. Similarly, the first disk spacer second surface pattern includes a uniform diameter. Alternatively, the first disk spacer second surface pattern may include a non-uniform diameter. For example, the first disk spacer second surface pattern may include a sinusoidal shaped periphery. In addition, the first disk spacer first surface pattern may include an effective diameter, and the first disk spacer second surface pattern may include an effective diameter greater than the effective diameter of the first disk spacer first surface pattern.

The disk drive may further include a disk clamp attached to the spindle motor hub with the first disk disposed between the disk clamp and the first disk spacer. The disk clamp has a disk clamping surface defined by a clamping surface pattern. Further, the clamping surface pattern may be the same as the first disk spacer first surface pattern. The first disk spacer first surface pattern may include an effective diameter, and the first disk spacer second surface pattern may include an effective diameter greater than the effective diameter of the first disk spacer first surface pattern. Further, the clamping surface pattern may include an effective diameter, and the first disk spacer second surface pattern may include an effective diameter greater than the effective diameter of the clamping surface pattern.

The spindle motor hub may further include a hub body and a hub flange extending from the hub body. The hub flange has a disk supporting surface defined by supporting surface pattern, and the second disk is disposed between the first disk spacer and the hub flange. The supporting surface pattern may be the same as the first disk spacer second surface pattern. Further, the first disk spacer second surface pattern may include an effective diameter, and the first disk spacer first surface pattern may include an effective diameter greater than the effective diameter of the first disk spacer second surface pattern. Further, the supporting surface pattern may include an effective diameter, and the first disk spacer first surface pattern may include an effective diameter greater than the effective diameter of the supporting surface pattern.

The disk drive may further include a second disk spacer having a second disk spacer first side disposed adjacent the second disk with the second disk disposed between the first and second disk spacers. The second disk spacer first side is defined by second disk spacer first surface pattern. The first disk spacer second surface pattern may be the same as the second disk spacer first surface pattern.

DESCRIPTION OF THE PREFERRED EMBODIMENTS

Figure 1:
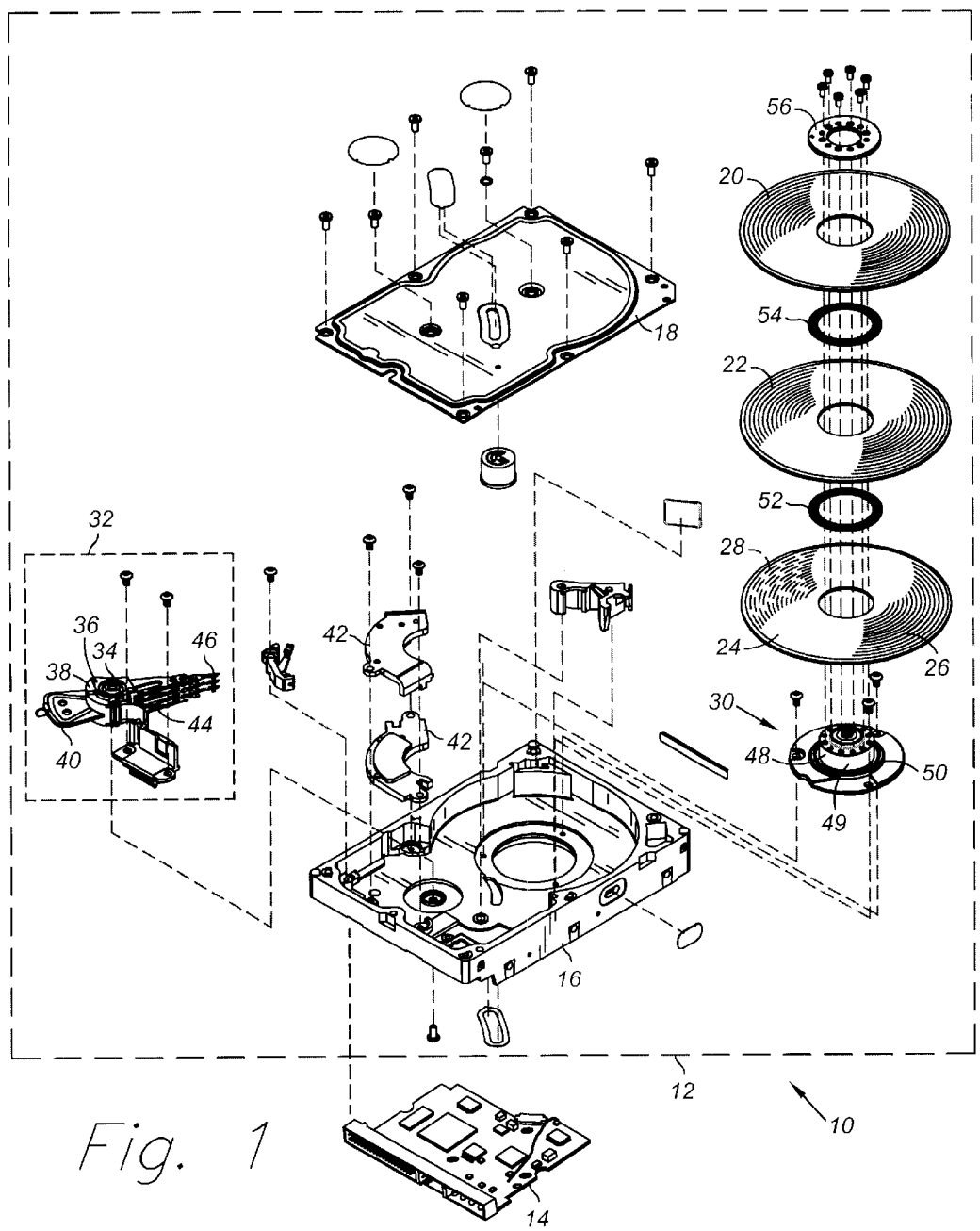
FIG. 1 is an exploded perspective view of a disk drive as constructed in accordance with aspects of the present invention.

Referring now to the drawings wherein the showings are for purposes of illustrating preferred embodiments of the present invention only, and not for purposes of limiting the same, FIGS. 1–4 illustrate a disk drive in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side and a track 28 (shown in phantom) on a lower facing side. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes a head (the uppermost one being denoted 46) for reading and writing data to and from the disks 20, 22, 24.

Figure 2:
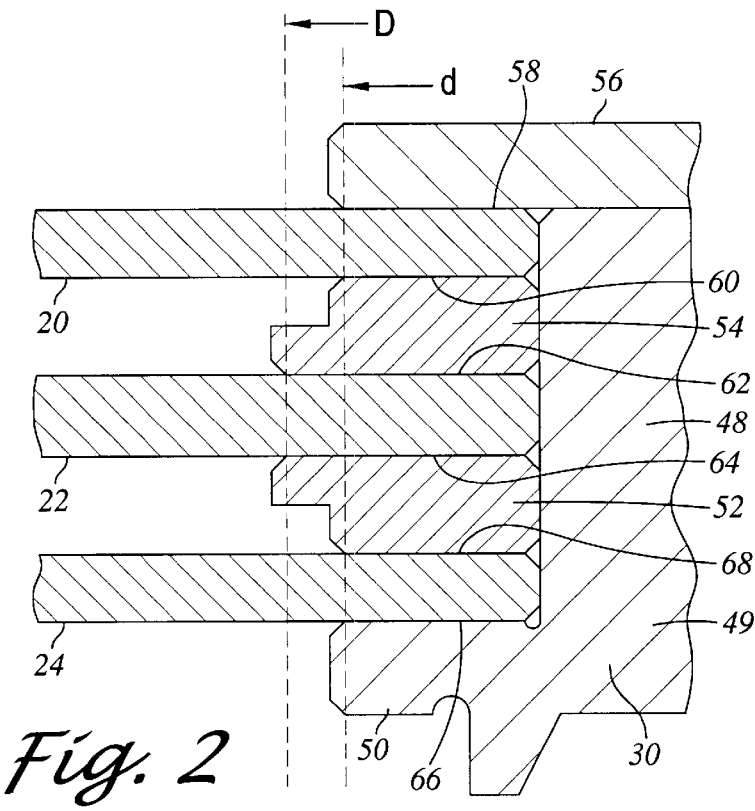
FIG. 2 is an enlarged cross sectional view of a portion of the disk drive of FIG. 1.

Referring additionally to the cross-sectional view of a portion of the disk drive 10 of FIG. 2, the spindle motor 30 includes a spindle motor hub 48 that is rotatably attached to the disk drive base 16. The spindle motor hub 48 has a hub body 49 and a hub flange 50 that extends from the hub body 49. The hub flange 50 includes a supporting surface 66 for supporting a lowermost one of the disks, namely disk 24. The remaining disks 22, 20 are stacked and separated with annular disk spacers 52, 54 that are disposed about the hub body 49. The disk spacer 54 includes an upper side 60 and an opposing lower side 62, and the disk spacer 52 includes an upper side 64 and an opposing lower side 68. A disk clamp 56 is attached about the spindle motor hub 48 and is utilized to apply a clamping force against the topmost disk 20 for securing all the disks 20, 22, 24 to the spindle motor hub 48. In this regard, the disk clamp 56 includes a clamping surface 58 disposed against the disk 22. The spindle motor 30 typically includes a spindle motor base that is attached to the disk drive base 12. A shaft is coupled to the spindle motor base and the spindle motor hub 48 surrounds the shaft. The spindle motor hub 48 may be rotatably coupled to the shaft and therefore the spindle motor base typically via a pair of bearing sets. A stator is positioned about the shaft and is attached to the spindle motor base. A magnet element is attached at bottom portion of the hub flange 50. The stator includes windings that selectively conduct current to create a magnetic field that interacts with the various poles of the magnet element. Such interaction results in forces applied to the spindle motor hub 48 that tend to rotate the spindle motor hub 48 and the attached disks 20, 22, 24.

An aspect of the invention can be regarded as the disk drive 10 that includes the disk drive base 16 and the spindle motor hub 48 that is rotatably coupled to the disk drive base 16. The disk drive 10 further includes a first disk, such as the disk 20, disposed about the spindle motor hub 48. The disk drive 10 further includes a second disk, such as the disk 22, also disposed about the spindle motor hub 48. The disk drive 10 further includes a first disk spacer, such as the disk spacer 54 disposed between and in mechanical communication with the first and second disks. The first disk spacer has a first disk spacer first side (such as the upper side 60 of the disk spacer 54) disposed adjacent the first disk and an opposing first disk spacer second side (such as the lower side 62 of disk spacer 54) disposed adjacent the second disk. The first disk spacer first side is defined by a first disk spacer first surface pattern. The first disk spacer second side is defined by a first disk spacer second surface pattern different than the first disk spacer first surface pattern. As used herein "surface pattern" refers to "an outer peripheral surface". As used herein the term "different" is used to denote that which is beyond normal manufacturing tolerances and is designed as such.

It is contemplated that during operation of the disk drive 10, the inner disk 22a may be subjected to different air flow conditions than the outermost disks 20, 24. This is because the inner disk 22 is disposed adjacent the disks 20, 24 which are similarly rotating. Whereas the outermost disks 20, 24 are each disposed adjacent a similarly rotating structure (e.g., disk 22) and a respective stationary structure (e.g., the interior of the cover 18 and the disk drive base 16 among other disk drive components). Such differing air flow environments are contemplated to impact the motion of the disks 20, 22, 24 differently. Comparatively, the inner disk 22 is observed to have a higher degree of disk motion or vibration due to such air flow environment (i.e., disk flutter). Such disk flutter affects the position errors associated with positioning of the heads 46 relative to the disks 20, 22, 24. It is contemplated that the different surface patterns of each side of the disk spacers, such as disk spacers 52, 54, result in different boundary conditions of the adjacent disks. Such manipulation of the boundary conditions of the disks effect the vibration modes of the disks. As such, the inner disk 22 may be subjected to boundary conditions which tend to constrain the inner disk 22 a greater amount than in comparison the outer disks 20, 24. It is contemplated that by designing the inner disk 22 to be relatively more constrained, the position errors associated with the inner disk 22 may be designed to be comparable to those of the outer disks 20, 24 despite the differing air flow environments.

In addition, it is contemplated that by designing at least one of the disks 20, 22, 24 to have different boundary conditions, this results is differences in the resonance modes of such disks 20, 22, 24. Such different resonance modes tend to avoid the disks respectively being a resonance excitation source of the adjacent disk resulting in relatively increased vibration amplitudes. Such relatively increased resonance amplitudes impact to position errors associated with positioning of the heads 46 relative to the disks 20, 22, 24. Thus, by designing the disks 20, 22, 24 to have at least one of the disks 20, 22, 24 to have different boundary conditions this tends to decouple any mutual or cross excitation of resonance modes.

Figure 3:
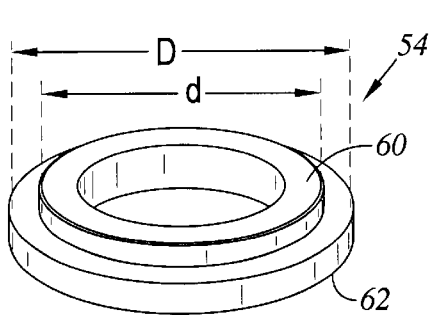
FIG. 3 is a perspective view of the disk spacer of FIG. 1.
Figure 4:
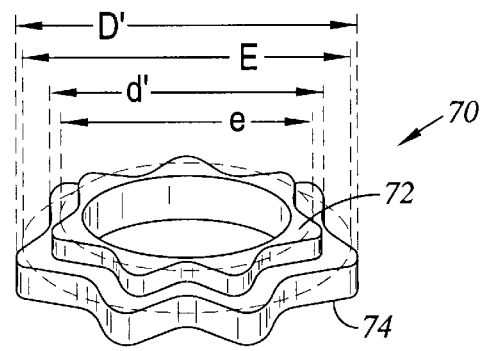
FIG. 4 is a perspective view of another disk spacer constructed in accordance with another embodiment of the present invention.

The disk drive 10 includes the disk clamp attached to the spindle motor hub 48. Disk 20 is disposed between the disk clamp and the disk spacer 54. A perspective view of the disk spacer 54 is shown in FIG. 3. The disk clamp 54 includes the clamping surface 58 that is defined by a clamping surface pattern. Disposed adjacent the opposite side of the disk 20 is the Lipper side 60 of the disk spacer 54. The upper side 60 is defined by an upper side surface pattern. In this embodiment, the clamping surface pattern is the same as the upper side surface pattern. As used herein the term same is used to denote that which is within normal manufacturing tolerances. As such, the boundary conditions of the disk 20 is substantially the same on both sides of the disk 20. It is understood, however, that this is not required to practice the present invention. The adjacent disk 22, which is an inner disk (i.e., sandwiched between two disks), has boundary conditions that are different than that of the disk 20. This is accomplished via the disk spacers 54, 52. Disk spacer 54 includes the lower side 62 that is constructed to include a different surface pattern than that of the upper side 60. The difference in the surface patterns advantageously results in a difference in the boundary conditions supporting the two disks 20, 22. In the embodiment shown, the disk spacer 52 includes the upper side 64 that is defined by an upper side surface pattern. The upper side surface pattern of the upper side 64 of the disk spacer 52 is configured to be the same as the lower side surface pattern of the lower side 62 of the disk spacer 54.

The clamping surface pattern and the surface pattern of the upper side 60 of the disk spacer 54 include the same diameter, denoted "d". The surface patterns of the lower side 62 of the disk spacer 54 and the upper side 64 of the disk spacer 52 include the same diameter, denoted "D". Further, the diameter D of the surface patterns of the lower side 62 of the disk spacer 54 and the upper side 64 of the disk spacer 52 is greater than the diameter d of the clamping surface pattern and the surface pattern of the upper side 60 of the disk spacer 54. In this regard, the disk 22 is more constrained than disk 20. In effect, by manipulating the boundary conditions of the disks 20, 22 through the surface patterns of the disk spacers 54, 52, the disk 22 is effectively stiffer than disk 20 and therefore has different vibration characteristics.

The spindle motor hub 48 includes the hub flange 50. The hub flange 50 has the disk supporting surface 66 that is defined by a supporting surface pattern. The disk 24 is supported by the disk supporting surface 66. Disposed adjacent the opposite side of the disk 24 is the lower side 68 of the disk spacer 52. The lower side 68 is defined by a lower side surface pattern. In this embodiment, the supporting surface pattern is the same as the lower side surface pattern. As such, the boundary conditions of the disk 24 is substantially the same on both sides of the disk 24. The adjacent disk 22 has boundary conditions that are different than that of the disk 24. Disk spacer 52 includes the upper side 64 that is constructed to include a different surface pattern than that of the lower side 68. The difference in the surface patterns advantageously results in a difference in the boundary conditions supporting the two disks 22, 24. In the embodiment shown, the disk spacer 54 includes the lower side 62 that is defined b the lower side surface pattern. The lower side surface pattern f the lower side 62 of the disk spacer 54 is configured to be the same as the upper side surface pattern of the upper side 64 of the disk spacer 52.

The support surface pattern and the surface pattern of the lower side 68 of the disk spacer 52 include the same diameter, denoted "d". The surface patterns of the upper side 64 of the disk spacer 52 and the lower side 62 of the disk spacer 54 include the same diameter, denoted "D". Further, the diameter D of the surface patterns of the upper side 64 of the disk spacer 52 and the lower side 62 of the disk spacer 54 is greater than the diameter d of the supporting surface pattern and the surface pattern of the lower side 68 of the disk spacer 52. In this regard, the disk 22 is more constrained than disk 24. In effect, by manipulating the boundary conditions of the disks 24, 22 through the surface patterns of the disk spacers 54, 52, the disk 22 is effectively stiffer than disk 24 and therefore has different vibration characteristics.

While the disk drive 10 is depicted in FIGS. 1 and 2 as included a single inner disk 22, it is contemplated that additional inners disks may be provided. In this regard, additional disk spacers may also be provided. Such additional disk spacers may be of a nature as having both sides of a same surface pattern, and need not be of the configuration of the disk spacers 52, 54. In this respect, additional inner disks may be constrained to have boundary conditions similar to that of inner disk 22.

The surface pattern of the upper and lower sides 60, 62 of the disk spacer 54 and the upper and lower sides 64, 68 of the disk spacer 52 may include a uniform diameter. In the embodiment shown in FIGS. 2 and 3, sides 60, 68 include surface patterns having a uniform diameter d, and sides 62, 64 include surface patterns having a uniform diameter D. Thus, the surface patterns may be of constant radii. While the surface patterns are shown to be solid between that inner portion disposed adjacent the hub body 49 to the constant radii in a band like configuration, the contact surface may be expanded from hub body 49 in a narrower band configuration.

It is contemplated that other surface pattern configurations may be utilized. For example, referring now to FIG. 4, there is depicted another embodiment of a disk spacer 70 which may be utilized in the disk drive 10. The disk spacer 70 includes an upper side 72 and an opposing lower side 74. The upper side 72 is defined by a surface pattern different than a surface pattern defining the lower side 74. The surface patterns of the upper and lower sides 72, 74 each include a non-uniform diameter. In the embodiment shown for example, the surface patterns of the upper and lower sides 72, 74 each have a sinusoidal shaped periphery. The disk spacer 70 may be configured to have a maximum diameter as measured at peak radial distances, as denoted respectively "D" and "d'". Further, the surface patterns of the sides 72, 74 of the disk spacer 70 may be characterized as having effective diameters, as respectfully denoted "E" and "e". Such effective diameters are those that the surface pattern results in similar vibration characteristics of an adjacent disk of a disk spacer having surface pattern of a uniform diameter of such distance. In addition, it is contemplated that the different sides of the disk spacer may include surface patterns at different angular positions with respect to each other. For example, though not shown, the surface patterns of the sides 72, 74 of the disk spacer 74 may be shifted with respect to the phase of the sinusoidal shaping of the peripheries of the surface patterns. In this regard, such surface pattern may even be modified to be of the same sized but may be phase shifted and therefore be considered as having different surface patterns.

We claim:

1. A disk drive comprising:
    a disk drive base;
    a spindle motor hub rotatably coupled to the disk drive base;
    a first disk disposed about the spindle motor hub;
    a second disk disposed about the spindle motor hub; and
    a first disk spacer disposed between and in mechanical communication with the first and second disks, the first disk spacer having a first disk spacer first side disposed adjacent the first disk and an opposing first disk spacer second side disposed adjacent the second disk, the first disk spacer first side defined by a first disk spacer first surface pattern, the first disk spacer second side defined by a first disk spacer second surface pattern different than the first disk spacer first surface pattern, the first disk spacer first surface pattern having a periphery defined by a non-uniform radial distance.

2. The disk drive of claim 1 wherein the first disk spacer first surface pattern includes a sinusoidal shaped periphery.

3. The disk drive of claim 1 wherein the first disk spacer second surface pattern includes a periphery defined by a non-uniform radial distance.

4. The disk drive of claim 3 wherein the first disk spacer second surface pattern includes a sinusoidal shaped periphery.

5. The disk drive of claim 1 wherein the first disk spacer first surface pattern includes an effective diameter, the first disk spacer second surface pattern includes an effective diameter greater than the effective diameter of the first disk spacer first surface pattern.

6. The disk drive of claim 1 further comprises a disk clamp attached to the spindle motor hub with the first disk disposed between the disk clamp and the first disk spacer, the disk clamp having a disk clamping surface defined by a clamping surface pattern.

7. The disk drive of claim 6 wherein the clamping surface pattern is the same as the first disk spacer first surface pattern.

8. The disk drive of claim 6 wherein the first disk spacer first surface pattern includes an effective diameter, the first disk spacer second surface pattern includes an effective diameter greater than the effective diameter of the first disk spacer first surface pattern.

9. The disk drive of claim 6 wherein the clamping surface pattern includes an effective diameter, the first disk spacer second surface pattern includes an effective diameter greater than the effective diameter of the clamping surface pattern.

10. The disk drive of claim 1 wherein the spindle motor hub further includes a hub body and a hub flange extending from the hub body, the hub flange has a disk supporting surface defined by a supporting surface pattern, the second disk is disposed between the first disk spacer and the hub flange.

11. The disk drive of claim 10 wherein the supporting surface pattern is the same as the first disk spacer second surface pattern.

12. The disk drive of claim 10 wherein the first disk spacer second surface pattern includes an effective diameter, the first disk spacer first surface pattern includes an effective diameter greater than the effective diameter of the first disk spacer second surface pattern.

13. The disk drive of claim 10 wherein the supporting surface pattern includes an effective diameter, the first disk spacer first surface pattern includes an effective diameter greater than the effective diameter of the supporting surface pattern.

14. The disk drive of claim 1 further comprising a second disk spacer having a second disk spacer first side disposed adjacent the second disk with the second disk disposed between the first and second disk spacers, the second disk spacer first side defined by second disk spacer first surface pattern.

15. The disk drive of claim 14 wherein the first disk spacer second surface pattern is the same as the second disk spacer first surface pattern.

16. A disk drive comprising:
    a disk drive base:
    a spindle motor hub rotatably coupled to the disk drive base;
    a first disk disposed about the spindle motor hub;
    a second disk disposed about the spindle motor hub;
    a first disk spacer disposed between and in mechanical communication with the first and second disks, the first disk spacer having a first disk spacer first side disposed adjacent the first disk and an opposing first disk spacer second side disposed adjacent the second disk, the first disk spacer first side defined by a first disk spacer first surface pattern, the first disk spacer second side defined by a first disk spacer second surface pattern different than the first disk spacer first surface pattern; and
    a disk clamp attached to the spindle motor hub with the first disk disposed between the disk clamp and the first disk spacer, the disk clamp having a disk clamping surface defined by a clamping surface pattern, the clamping surface pattern including an effective diameter, the first disk spacer second surface pattern including an effective diameter greater than the effective diameter of the clamping surface pattern.

17. The disk drive of claim 16 wherein the clamping surface pattern is the same as the first disk spacer first surface pattern.

18. The disk drive of claim 16 wherein the first disk spacer first surface pattern includes an effective diameter, the first disk spacer second surface pattern includes an effective diameter greater than the effective diameter of the first disk spacer first surface pattern.

19. A disk drive comprising:

a disk drive base;

a spindle motor hub rotatably coupled to the disk drive base;

a first disk disposed about the spindle motor hub;

a second disk disposed about the spindle motor hub; and a first disk spacer disposed between and in mechanical communication with the first and second disks, the first disk spacer having a first disk spacer first side disposed adjacent the first disk and an opposing first disk spacer second side disposed adjacent the second disk, the first disk spacer first side defined by a first disk spacer first surface pattern, the first disk spacer second side defined by a first disk spacer second surface pattern different than the first disk spacer first surface pattern;

wherein the spindle motor hub further includes a hub body and a hub flange extending from the hub body, the hub flange has a disk supporting surface defined by a supporting surface pattern, the second disk is disposed between the first disk spacer and the hub flange, the supporting surface pattern including an effective diameter, the first disk spacer first surface pattern including an effective diameter greater than the effective diameter of the supporting surface pattern.

20. The disk drive of claim 19 wherein the supporting surface pattern is the same as the first disk spacer second surface pattern.

21. The disk drive of claim 19 wherein the first disk spacer second surface pattern includes an effective diameter, the first disk spacer first surface pattern includes an effective diameter greater than the effective diameter of the first disk spacer second surface pattern.

\* \* \* \* \*